Figure 1:
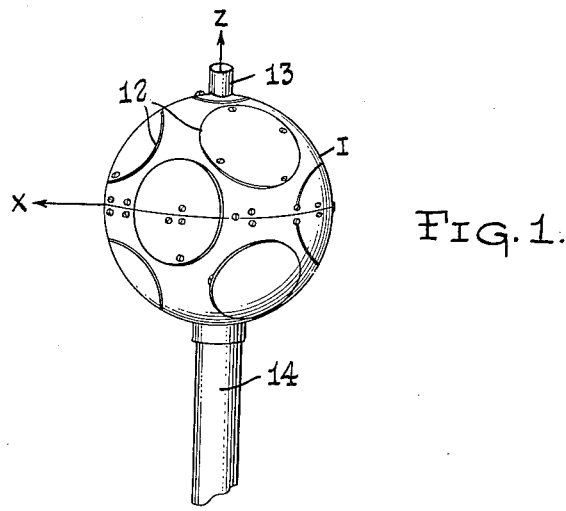

Oct. 19, 1965

A. BISBERG  
FLUID-FLOW FORCE AND/OR DIRECTION MEASURING APPARATUS AND METHOD  
Filed Oct. 3, 1962

3,212,329

INVENTOR  
ARTHUR BISBERG

BY *Rines and Rines*

ATTORNEYS

United States Patent Office 3,212,329
Patented Oct. 19, 1965

3,212,329
FLUID-FLOW FORCE AND/OR DIRECTION
MEASURING APPARATUS AND METHOD
Arthur Bisberg, Lexington, Mass., assignor to Flow Corporation, Cambridge, Mass., a corporation of Massachusetts
Filed Oct. 3, 1962, Ser. No. 228,043
2 Claims. (Cl. 73—189)

The present invention relates to methods of and apparatus for measuring the force (or velocity) and/or direction of flowing fluids, and, more particularly, though by no means exclusively, to wind velocity and direction transducing apparatus.

Numerous types of wind (or other fluid-flow) detecting instruments have been evolved and employed throughout the years, ranging from typical cup anemometer and vane indicator combinations to apparatus having one or more tubular or other air ports associated with pressure-measuring transducers or diaphragms. Equipment of the former type, however, has considerable inertia which prevents rapid response to gusts and other transients and is not readily adapted for simultaneous three-orthogonal-direction (or axis) measurements of force (or velocity) components. The latter type equipment has similar drawbacks requiring the disadvantageous introduction of air or other fluid samples in tubes or parts of the apparatus.

An object of the present invention, accordingly, is to provide a new and improved method of and apparatus for measuring fluid-flow force and/or direction that shall not be subject to these disadvantages, but that, rather, operates without external moving parts or the introduction of fluid samples into the apparatus and, in addition, is of low inertia and is rapidly responsive to gusts and the like. The invention, moreover, provides for accurate correlation between force and direction, enabling simultaneous readings on three orthogonal axes, if desired, permitting turbulence measurements and allowing determination of the true vector velocity.

Another object is to provide a new and improved fluid-flow force (or velocity) and/or direction measuring apparatus of more general utility, also.

Still an additional object is to provide a novel dynamic wind vector indicator enabling, in a single instrument, continuous readout and/or recording of the instantaneous magnitude of all three components of wind force, if desired; north-south, east-west, and up-down.

In summary, from one of its aspects, the invention contemplates apparatus for indicating at least one of the force and direction of flow of a fluid medium, that comprises a substantially symmetrical surface of revolution for insertion into the medium, a fixed reference support, means for mounting the surface upon the support to enable relative displacement of the surface and support in response to fluid-flow forces acting upon the surface, and transducer means for detecting at least two orthogonal components of such displacement and converting the same into preferably electrical signals. Preferred constructional details will hereinafter be set forth.

Other and further objects will be later explained and will be more particularly pointed out in connection with the appended claims.

Figure 2:
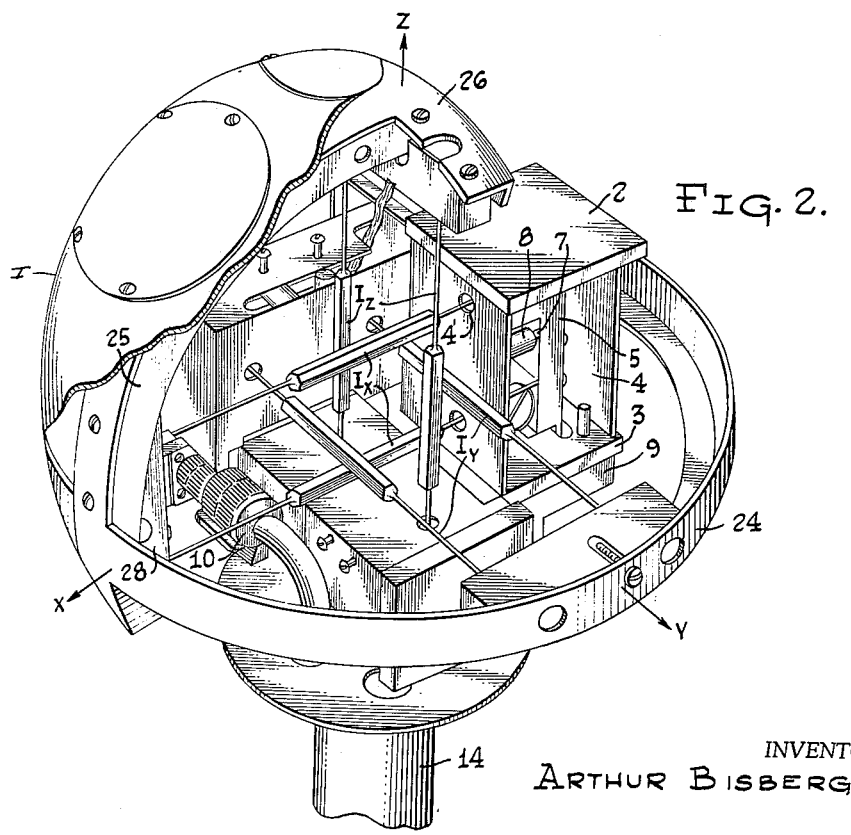

The invention will now be described in conjunction with the accompanying drawing, FIG. 1 of which is an isometric view of a preferred form of the same illustrated as used for wind velocity and direction measurements, though the utility of the invention for other types of fluid flow detection and measurements is clearly indicated; and FIG. 2 is a similar view, upon an enlarged scale, partly broken away to illustrate details of construction.

Referring to the form of invention shown in FIG. 1, a thin-shelled drag-sphere I is mounted, by an interiorly disposed three-orthogonal-direction (X-Y-Z axes or coordinates) flexure force balance structure, later described, upon a fixed reference standard support 14. Force components directed against the surface I along each of the X, Y and Z directions are enabled correspondingly to displace the spherical member I relative to the fixed reference standard 14; and it is this three-component displacement that, in view of the symmetrical nature of the spherical surface of revolution, may be simultaneously detected and transduced into corresponding X-, Y- and Z- component electric signals. These signals, in turn, enable the indicating and/or recording of total magnitude and direction information, or magnitude and sense of each of the three orthogonal X, Y and Z components. Through this flexural suspension of the spherical member I upon the fixed reference support 14, the ratios between the detected force components will determine the flow direction with no sign ambiguity. The well-known drag-law of approximately quadratic relationship between the total force vector (i.e. the square root of the sum of the squares of the components) and the velocity magnitude thus enables a velocity determination.

In the embodiment of FIG. 2, the spherical surface or skin I is secured to an X-Y plane ring 24, an X-Z plane ring 25 and a Z-Y plane ring 26, all interconnected, as shown. The spherical member I, in response to fluid-flow forces acting thereupon, will be displaced along any or all of the X, Y and Z axes, relative to the fixed reference support standard 14, depending upon the components of force exerted by the fluid medium upon the sphere I.

The flexural-balance mechanical suspension for so mounting the spherical member I includes a pair of flexure drive rods $1_x$, $1_y$ and $1_z$ for each of the X, Y and Z directions. The connection and operation of each pair of drive rods is the same so that it will suffice to describe the details in connection with, for example, the rods $1_x$. The left-hand ends of these rods $1_x$ are rigidly connected to a tie block 28 at equally spaced points on either side of the X-axis, connected to the X junction of the X-Y-Z rings 24–25–26 and thus to the portion of the spherical surface covering the same. It will be noted that the thin terminal and thicker intermediate portions of the drive rods $1_x$ render them readily flexible to displacements in the Y and Z directions, but maintain them relatively stiff along their axes, parallel to the X-direction.

The right-hand ends of the drive rods $1_x$ are rigidly connected to an angle flexure finger 5 that, in turn, is connected to a pair of spaced flexure spring plates 4 joined at their upper and lower edges by respective end blocks 2 and 3. The end block 2 is free to move in response to movement of the angular flexure finger 5, but the end block 3 is rigidly secured to a support member 9 that, in turn, is rigidly secured to the reference standard 14. Since the right-hand ends of the drive rods $1_x$ pass through apertures 4' in the left-hand spring plate 4 and rigidly connect to the flexure finger 5, a fluid-flow force component directed either to the left or the right, in the X-direction, will cause displacement of the spherical member I that will exert force along the axes of the drive rods $1_x$ and thus flex the flexure finger 5 relative to the fixed reference supporting structure 14–9–3.

This relative displacement may be readily measured or detected by, for example, a conventional linear variable differential transformer or transducer 8 having a core 7 connected to move with the flexing of the flexure finger 5, within a coil 8 of the transducer that is supported from, for example, the fixed block 3. Suitable damping in the force-measuring system will suppress small residual oscillatory motions at frequencies well above a few cycles per second, the equivalent high spring-low mass relationship of the system thereof having a high natural frequency as a result of the employment of a light shell for the sphere I and stiff force transducers $1_x$–5–7, etc. Electrical signals representative of the X-direction fluid force are thus attained.

The same kind of structure is shown associated with the $1_y$ and $1_z$ flexure drive rods, enabling the production at the electrical outlet 10 of electrical signals corresponding to each of the X-, Y-, and Z-direction force components. Available D.C. voltage output for each axis may thus be applied to any conventional X-Y recorder or other computer or indicator input.

In order to avoid lift, laminar-turbulent drag transitions, and like effects resulting from wind and similar fluid-flow eddy currents, spoiler projections or rougheners, preferably in the illustrated form of a plurality of circular loops or rings 12 projecting from the skin of the sphere I, are provided. This roughening of the spherical surface has been found to produce a wake pattern that is substantially uniform over the useful range of the instrument, resulting in a nearly constant drag coefficient for a Reynolds Number Range of $10^2$ to $10^6$. The roughening can also take the form of screening or perforations. A protuberance 13, FIG. 1, moreover, may be employed at the top of the spherical member I preferably diametrically in line with the standard 14 depending below the sphere I, to compensate for the effect upon the fluid flow of the presence of the standard support structure 14.

The employment of the flexure type mounting above-described, moreover, minimizes the hysteresis that are present in pivoted or other mechanical suspension arrangements. With a one-foot sphere, for example, constructed as shown in FIGS. 1 and 2, signal responses faster than 15 milliseconds have been obtained for wind velocities up to 100 knots, more or less, and with a force resolution that is 0.2% of full scale. The annular range of this unit is 360° in the horizontal plane and ±30° from the horizontal in the vertical plane, for maximum errors less than 5% in magnitude and 2° in direction. Through the use of correction curves, moreover, the vertical angle range has been extended. Output voltages of from 0–0.5 volts D.C. for each axis are readily obtainable at 3,000-ohms impedance, with the unit operable with standard mains 50–60 cycle alternating-current power or battery power.

While the system of FIGS. 1 and 2 has the further advantages of no exposed components, no external moving parts, and completely solid-state components and circuitry, the broadest concept of the invention may still be employed without all these advantages. If, for example, the spherical or other substantially symmetrical surface of revolution I is rigidly connected by the standard 14 to a fixed reference support, such as the ground or a roof, the transducers 8, or any desired capacitive or other transducers, may be positioned along the X-, Y- and/or Z-axes at predetermined portions of a conductive standard 14 itself, thus to obtain simultaneous readings, along two or three axes, of the displacement of the spherical or other member I relative to the fixed reference ground or other support. Clearly other types of transducers and mounting or suspension systems may also be used in the system of FIGS. 1 and 2, as may external measurements be effected, if desired. Cylindrical, polygonic and other types of similar surfaces may also be employed, particularly for at least two-dimensional force and/or direction measurements, and all such are generically referred to herein as substantially symmetrical surfaces of revolution. Further modifications will also occur to those skilled in the art and all such are considered to fall within the spirit and scope of the invention as defined in the appended claims.

What is claimed is:

1. Apparatus for indicating at least one of the force and direction of flow of a fluid medium, that comprises, a surface of revolution for insertion into the medium, a fixed reference support, means disposed within the surface for flexurally mounting the surface upon the support to enable relative flexural displacement of the surface and support in response to fluid-flow forces acting upon the surface, the flexural mounting means comprising flexural drive rod means connecting a portion of the surface along each of three orthogonal directions, and transducer means disposed within the surface for detecting at least three orthogonal components of such flexural displacement, corresponding to the three orthogonal directions, and converting the same into corresponding electrical signals, the transducer means being supported to detect relative flexural displacements effected by the drive rod means with respect to the said fixed reference support, with the said drive rod means being relatively stiff along its said corresponding direction, but relatively flexible along the other two orthogonal directions and comprising a pair of rods spaced on opposite sides of the corresponding direction axis.

2. Apparatus as claimed in claim 1 and in which there is provided flexural finger means connected with flexural spring means for coupling the flexural displacement of the drive rod means to the said transducer means.

References Cited by the Examiner

UNITED STATES PATENTS 2,918,816  12/59  Ormond ---------------- 73—147
2,959,052  11/60  Alexander et al. --------- 73—189

OTHER REFERENCES

Publication: Thesis entitled, "A Three Component Wind Velocity Indicator," by Glyndon L. Lynde. Submitted for a degree requirement at Massachusetts Institute of Technology (1952), 38 pages.

RICHARD C. QUEISSER, *Primary Examiner.*